United States Patent
Turner et al.

(10) Patent No.: US 7,783,906 B2
(45) Date of Patent: Aug. 24, 2010

(54) MAXIMUM POWER USAGE SETTING FOR COMPUTING DEVICE

(75) Inventors: Michael R. Turner, Monroe, WA (US); Rhonda Seiber Doane, Bothell, WA (US)

(73) Assignee: International Business Machines Corporation, Armonk, NY (US)

( * ) Notice: Subject to any disclaimer, the term of this patent is extended or adjusted under 35 U.S.C. 154(b) by 751 days.

(21) Appl. No.: 11/675,532

(22) Filed: Feb. 15, 2007

(65) Prior Publication Data

US 2008/0201589 A1    Aug. 21, 2008

(51) Int. Cl.
*G06F 1/00* (2006.01)
*G06F 1/26* (2006.01)

(52) U.S. Cl. .................. 713/321; 713/300; 713/320

(58) Field of Classification Search .................. 713/300, 713/320, 321
See application file for complete search history.

(56) References Cited

U.S. PATENT DOCUMENTS

| | | | |
|---|---|---|---|
| 2002/0066045 A1 | 5/2002 | Layton | |
| 2005/0102544 A1* | 5/2005 | Brewer et al. | 713/320 |
| 2005/0283624 A1* | 12/2005 | Kumar et al. | 713/300 |
| 2006/0184287 A1 | 8/2006 | Belady | |
| 2006/0190745 A1* | 8/2006 | Matsushima et al. | 713/300 |
| 2006/0288241 A1* | 12/2006 | Felter et al. | 713/300 |
| 2007/0050650 A1* | 3/2007 | Conroy et al. | 713/300 |
| 2007/0245161 A1* | 10/2007 | Shaw et al. | 713/300 |
| 2008/0184044 A1* | 7/2008 | Leech et al. | 713/300 |

FOREIGN PATENT DOCUMENTS

| | | | |
|---|---|---|---|
| EP | 1557743 A | 7/2005 | |
| GB | 2402504 A | 12/2004 | |
| WO | 8600432 A | 1/1986 | |

OTHER PUBLICATIONS

PCT ISA Written Opinion in PCT counterpart case PCT/EP2008/051279, dated Jun. 13, 2008.
EPO Examination Report in EPO counterpart patent application 08 708 585.8 - 2224, dated Jul. 4, 2010.

* cited by examiner

*Primary Examiner*—Vincent T Tran
(74) *Attorney, Agent, or Firm*—Jason O. Piche

(57) ABSTRACT

A maximum power usage setting for a computing device is based on one or more of: a user-specified setting corresponding to how often a frequency of a processor of the computing device is likely to have to be decreased to reduce power usage by the computing device; an average frequency of the processor during a previous period in which the computing device was operated; a minimum frequency of the processor during the previous period; a maximum power that the computing device used during the previous period; and, a nominal frequency of the processor. When the computing device starts to use more power than the maximum power usage setting, the power used by the computing device is reduced so as not to exceed the setting, such as by decreasing the frequency at which the processor operates.

8 Claims, 3 Drawing Sheets

MAXIMUM POWER USAGE SETTING FOR COMPUTING DEVICE

FIELD OF THE INVENTION

The present invention relates generally to power usage by a computing device, and more particularly to determining a maximum power usage setting for the computing device, such that the power used by the computing device is reduced when the computing devices starts to use more power than the maximum power usage setting.

BACKGROUND OF THE INVENTION

Computing devices, such as computers, typically have maximum power ratings. The maximum power rating of a computing device is the maximum amount of power that the computing device can consume at any given moment. For example, the maximum power rating may be the maximum power rating that a power supply of the computing device is able to provide to the computing device.

However, computing devices typically do not consume power equal to their maximum power ratings, except under extreme processing loads, if ever. That is, a typical computing device usually consumes much less power than its maximum power rating. For any given individual computing device, this is of no concern to the owner or user of the computing device.

However, designers and maintainers of data centers have to worry about whether the data centers can provide sufficient power to hundreds, if not thousands or more, of computing devices operating within a data center. Even if the computing devices within a data center will typically not consume power equal to their maximum power ratings, because at least in theory the possibility exists for the computing devices to consume power equal to their maximum power ratings. As such, a data center usually has to be designed so that it is capable of providing this large amount of power.

Therefore, data centers typically are designed to provide much more power than the computing devices thereof will typically ever consume. This excess power capacity results in a great cost being incurred by the owners or operators of the data centers. They have to build in power capacity on the assumption that all the computing devices will consume power equal to their maximum power ratings, at the same time, even though this situation may never actually occur. For this and other reasons, there is a need for the present invention.

SUMMARY OF THE INVENTION

The present invention relates generally to a maximum power usage setting for a computing device. A method of one embodiment of the invention determines a maximum power usage setting for a computing device based on one or more of the following factors. The first factor is a user-specified setting corresponding to how often a frequency of a processor of the computing device is likely to have to be decreased to reduce power usage by the computing device. The second factor is the average frequency of the processor during a previous period in which the computing device was operated. The third factor is the minimum frequency of the processor during the previous period, and the fourth factor is the maximum power than the computing device used during this previous period. The fifth factor is the nominal frequency of the processor. The maximum power usage setting for the computing device is then set as has been determined.

Thereafter, for instance, where the computing device starts to use more power than the maximum power usage setting, the power used by the computing device is reduced so as not to exceed the maximum power setting. For example, the frequency of the processor of the computing device may be decreased. Decreasing the frequency of the processor results in the computing device consuming less power.

A computing device of an embodiment of the invention includes a processor, a power supply, and a mechanism. The processor is operable at a frequency that is modifiable to control power usage by the computing device. The power supply provides power to the computing device, and has a maximum power rating. The mechanism is to decrease the frequency at which the processor operates to reduce the power used by the computing device where the computing device starts to use more power than a maximum power usage setting that is less than the maximum power rating of the power supply. The maximum power usage setting is based on one or more of the five factors that have been described above.

An article of manufacture of an embodiment of the invention includes a tangible computer-readable medium and means in the medium. The computer-readable medium may be a recordable data storage medium, or another type of tangible computer-readable medium. The means is for decreasing the frequency at which a processor of a computing device operates to reduce power used by the computing device where the computing device starts to use more power than a maximum power usage setting. The maximum power usage setting is based on one or more of the five factors that have been described above.

At least some embodiments of the invention provide for advantages over the prior art. In particular, the maximum power usage setting for a computing device may be significantly lower than the maximum power rating of the computing device. As one example, the former setting may be 180 watts, while the latter setting may be 300 watts. Thus, while the computing device may be able to consume up to 300 watts of power, embodiments of the invention ensure that the computing device does not actually consume more than 180 watts of power. As a result, the power capacity of data centers can be designed around the lower maximum power usage settings for the computing devices thereof, instead of around the maximum power ratings of the computing devices, such that the owners or operators of these data centers realize significant cost savings.

In at least some embodiments of the invention, the maximum power usage setting for a computing device is intelligently determined based on a previous period in which the computing device was operated, and can furthermore be influenced by the user via a user-specified setting. For example, the maximum power usage setting may be based on the maximum power that the computing device used during this previous period, so that the maximum power usage setting is at least equal to this amount of power. As such, the frequency at which the processor of the computing device operates is likely not to have to be decreased to reduce the power consumed by the computing device, insofar as the computing device is likely to consume an amount of power that is less than the maximum power usage setting.

Because the maximum power usage setting may be significantly lower than the maximum power rating of the computing device, this means that power capacity of a data center can be determined around the lower maximum power usage setting (instead of around the higher maximum power rating) of the device, with little or no actual decrease in the computational capability of the computing device. However, the user can influence the maximum power usage setting in at least some embodiments of the invention by a user-specified setting that corresponds to how often the frequency of the processor of the computing device is likely to have to be decrease to reduce the power used by the computing device. As such, the user can provide for even a lower (or higher) maximum power usage setting than that which is determined.

Still other advantages, aspects, and embodiments of the invention will become apparent by reading the detailed description that follows, and by referring to the accompanying drawings.

BRIEF DESCRIPTION OF THE DRAWINGS

The drawings referenced herein form a part of the specification. Features shown in the drawing are meant as illustrative of only some embodiments of the invention, and not of all embodiments of the invention, unless otherwise explicitly indicated, and implications to the contrary are otherwise not to be made.

DETAILED DESCRIPTION OF THE DRAWINGS

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the present invention is defined only by the appended claims.

General Embodiment

Figure 1:
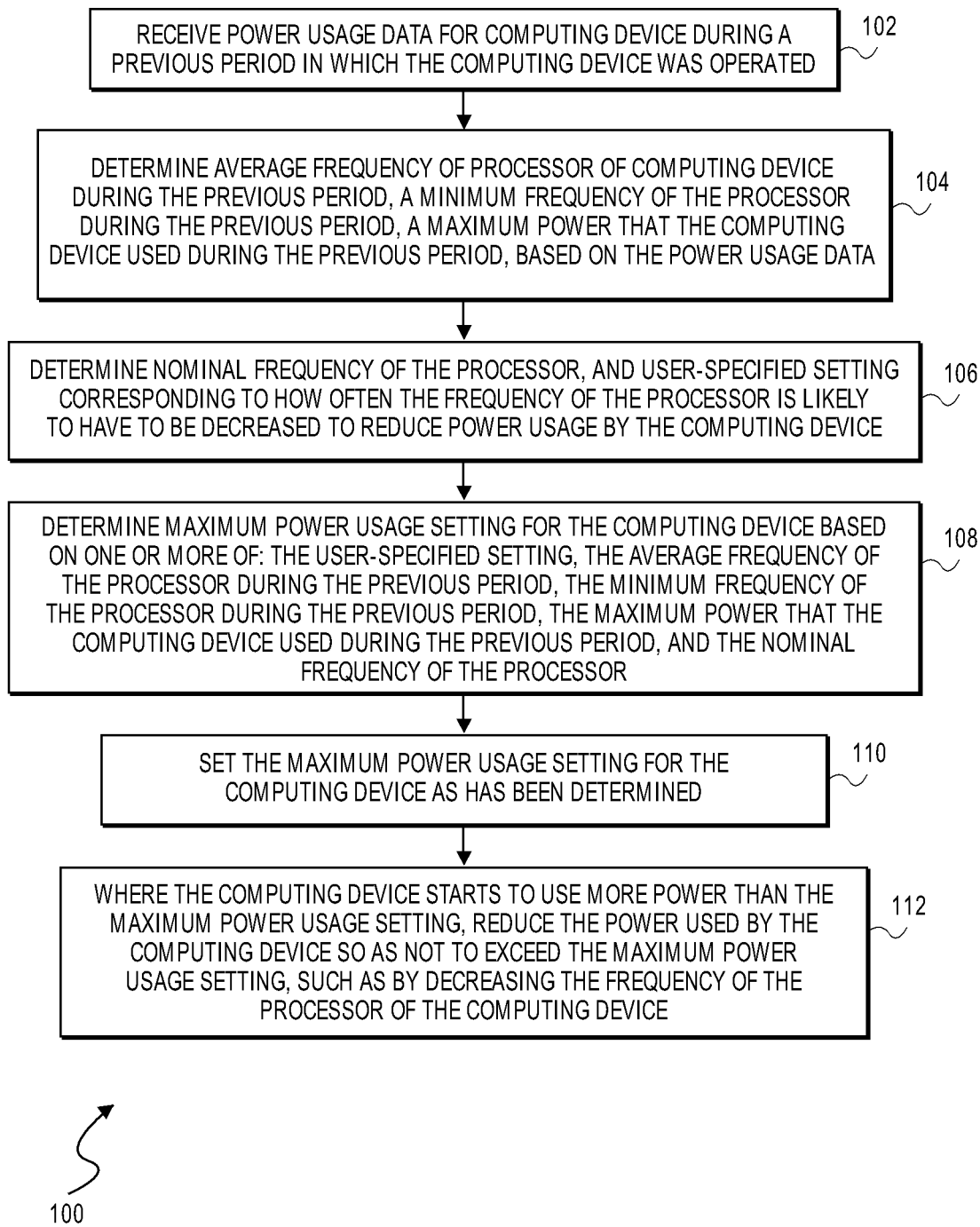
FIG. 1 is a flowchart of a method, according to an embodiment of the invention.

FIG. 1 shows a method 100, according to an embodiment of the invention. The method 100 is performed by, for, and/or in relation to a computing device having at least one processor that is operable at a frequency. The computing device may be a desktop or laptop computing device, a blade computing device, or another type of computing device. The frequency at which the processor of the computing device operates is modifiable, such that decreasing the frequency results in the computing device consuming less power, and increasing the frequency results in the computing device consuming more power.

Power usage data for the computing device during a previous period in which the computing device was operated is received (102). For example, the previous period may be measured in hours, days, weeks, or another period of time. The power usage data may be maintained by the computing device where the computing device has such power metering capability, as can be appreciated by those of ordinary skill within the art. The power usage data may include a number of records, where each record corresponds to a particular time during the period in which the computing device was operated. For example, there may be one record for each minute the computing device was operated.

Each record of the power usage data may indicate the power used by the computing device at the corresponding time of the record, and the frequency of the processor of the computing device at this time. The frequency of the processor of the computing device may be increased or decreased during operation of the computing device during this previous period of time. For example, an existing power management policy may increase or decrease the frequency of the processor to manage the power usage of the computing device during this period of time.

Thereafter, the following attributes are determined based on the power usage data and its constituent records (104). First, the average frequency of the processor during the previous period of time is determined, such as by averaging the frequency of the processor as specified by each record of the power usage data. Second, the minimum frequency of the processor during the previous period of time is determined, and which is the lowest frequency of the processor as specified by any record of the power usage data. Third, the maximum power that the computing device used during the previous period of time is determined, and which is the largest amount of power consumed by the computing device as specified by any record of the power usage data.

The nominal frequency of the processor is also determined, as is a user-specified setting (106). The nominal frequency of the processor is the rated frequency of the processor. The nominal frequency may be determined by querying the processor itself, or by querying another component of the computing device that has this information. The user-specified setting corresponds to how often the frequency of the processor is likely to have to be decreased to reduce power usage by the computing device.

For example, the user may be able to specify this setting as a numerical range from −X through +X, wherein in one embodiment, X may be twenty. A user-specified setting of zero can correspond to the user not biasing how often the computing device is likely to have the frequency of its processor decreased to reduce the power used by the computing device. That is, a user-specified setting of zero can mean that the user is not affecting a maximum power usage setting as will be determined later in the method 100, and which corresponds to the maximum amount of power that the computing device is allowed to use, even if its maximum power rating (such as of its power supply) is greater.

A user-specified setting of less than zero (i.e., a negative setting) can correspond to the user biasing how often the computing device is likely to have the frequency of its processor decreased to reduce the power used by the computing device so that the processor is more likely to have its frequency decreased to reduce power consumption. That is, a user-specified setting of less than zero can mean that the user is affecting the maximum power usage setting as will be determined later in the method 100, by potentially decreasing this maximum power usage setting as compared to as if the user-specified setting were zero. The more negative the user-specified setting is, the greater the potential decrease in the maximum power usage setting is.

A user-specified setting of greater than zero (i.e., a positive setting) can correspond to the user biasing how often the computing device is likely to have the frequency of its processor decreased to reduce the power used by the computing device so that the processor is less likely its frequency decreased to reduce power consumption. That is, a user-specified setting of greater than zero can mean that the user is affecting the maximum power usage setting as will be determined later in the method 100, by potentially increasing this maximum power usage setting as compared to as if the user-specified setting were zero. The more positive the user-specified setting is, the greater the potential increase in the maximum power usage setting is.

The maximum power usage setting for the computing device is then determined, based on one or more factors (108). These factors include the user-specified setting and the nominal frequency of the processor that were determined in part 106 of the method 100. These factors also include the average frequency of the processor, the minimum frequency of the processor, and the maximum frequency of the processor, during the previous period of time in which the computing device was operated, and which were determined in part 104 of the method 100. A specific manner by which the maximum power usage setting is determined based on one or more of these factors is described in detail later in the detailed description.

The maximum power usage setting is the maximum amount of power that the computing device is allowed to consume, before the frequency of the processor of the computing device is decreased so that the computing device uses less power and so that the power used by the computing device is less than the maximum power usage setting. The maximum power usage setting may be lower than the maximum power rating of the computing device, where the latter is the maximum amount of power that the computing device could ever potentially consume, based on, for instance, the rating of its power supply. For example, the maximum power rating of the computing device may be 300 watts, whereas the maximum power usage setting may be significantly lower, such as 180 watts.

The maximum power usage setting, as has been determined, is then set for the computing device (110). In one embodiment, the determination of the maximum power usage setting in part 108 may be performed by the computing device itself, such that the computing device itself then sets the maximum power usage setting in part 110. In another embodiment, the determination of the maximum power usage setting in part 108 may be performed by another computing device, such as a management computing device. In this situation, the management computing device informs the computing device in question of the maximum power usage setting in part 110.

Subsequently, when the computing device starts to use more power than the maximum power usage setting, the power used by the computing device is reduced so as not to exceed the maximum power usage setting (112). For example, in one embodiment, the frequency of the processor of the computing device may be decreased to reduce the power used by the computing device, as can be appreciated by those of ordinary skill within the art. Later, when other components of the computing device (e.g., the graphics card, the hard disk drives, and so on) are themselves using less power, the frequency of the processor may be increased back to its previous level to restore the computational capability of the computing device. This is because, in general, the lower the frequency at which a given type of processor operates, the lesser performance and thus the lesser computational capability the processor affords the computing device of which it is a part. It is noted that the method 100 may be periodically re-performed in one embodiment to render the maximum power usage setting more accurate based on the actual usage of the computing device.

Computerized System

Figure 2:
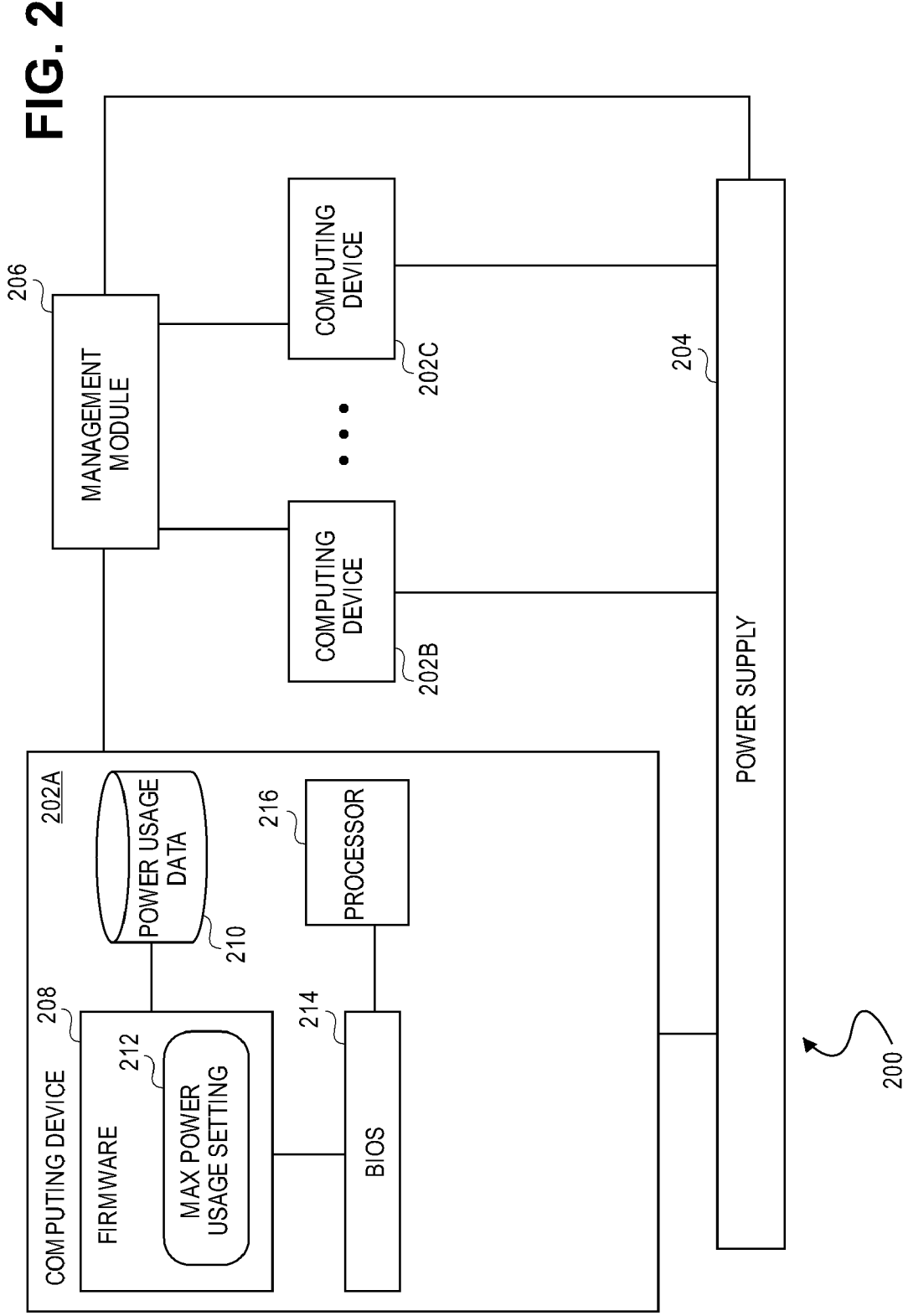
FIG. 2 is a diagram of a system, according to an embodiment of the invention.

FIG. 2 shows a computerized system 200, according to an embodiment of the invention. The computerized system 200 as particularly depicted in FIG. 2 is a blade computing system, in which all the computing devices 202A, 202B, . . . , 202N, collectively referred to as the computing devices 202 are each a blade computing device inserted into a chassis and share a common power supply 204. The power supply 204, in other words, provides the power needed by all the computing devices 202. Besides the computing devices 202 and the power supply 204, the system 200 includes a management module 206. Those of ordinary skill within the art can appreciate that the system 200 can include other components, in addition to and/or in lieu of those depicted in FIG. 2. For instance, the system 200 may not be a blade computing system, and thus in one embodiment each computing device may have its own power supply, instead of sharing the common power supply 204.

The computing device 202A is particularly described herein as representative of all the computing devices 202. The computing device 202A includes firmware 208, a basic input/output system (BIOS) 214, a processor 216, as well as other components 218, which may include memory, chipsets, hard disk drives, graphics cards, and so on. The computing device 202A is said to include the power supply 204, even where the power supply 204 is common to all the computing devices 202.

The firmware 208 includes nonvolatile memory that stores a maximum power usage setting 212. The maximum power usage setting 212, as has been described, is the maximum power that the computing device 202A is allowed to consume. The maximum power usage setting 212 is determined based on one or more factors or attributes that are themselves determined based on power usage data 210 stored in nonvolatile or volatile memory, as has also been described. As can be appreciated by those of ordinary skill within the art, the firmware 208 may record the power usage data 210 as the computing device 202A operates, receiving this information from the BIOS 214 as well as from the other components 218 and the processor 216 (such as through the BIOS 214).

Once the maximum power usage setting 212 has been specified, it is programmed into the BIOS 214 by the firmware 208. The BIOS 214 may monitor how much power the computing device 202A is consuming, and where the computing device 202A is consuming more than the maximum allowed power specified by the maximum power usage setting 212, decrease the frequency at which the processor 216 operates to reduce the power consumption of the computing device 202A. In one embodiment, the BIOS 214 and/or the firmware 208 may together be considered as constituting a mechanism to decrease the frequency at which the processor 216 operates to reduce the power used by the computing device 202A where the computing device 202A beings to use more power than the maximum power usage setting 212.

The capability of the computing device 202A to decrease the frequency at which the processor 216 operates to reduce power usage by the computing device 202A as a whole can be appreciated by those of ordinary skill within the art. Thereafter, the power usage by the computing device 202A thereafter may sufficiently decreases, by, for instance, the other components 218 using less power. As a result, the BIOS 214 may later increase the frequency at which the processor 216 operates back to its previous level as can also be appreciated by those of ordinary skill within the art.

In one embodiment, the management module 206 may determine the maximum power usage setting 212 for the computing device 202A. Thus, the management module 206 receives the power usage data 210 from the firmware 208, determines the maximum power usage setting 212 for the computing device 202A, and reports the maximum power usage setting 212 back to the computing device 202A for programming into the BIOS 214. The management module 206 may be part of one of the computing devices 202 of the system 200, the module 206 may be a separate computing device, or it may be another type of mechanism or module altogether, as can be appreciated by those of ordinary skill within the art.

The power supply 204 thus has a maximum power rating, which is the power it is capable of providing to the computing device 202A, and/or to all the computing devices 202 as a whole. The maximum power usage setting 212 for the computing device 202A, as has been described, can be and typically is less than this maximum power rating. For example, there may be a maximum total of six computing devices 202 within the chassis of the blade computing system 200. The power supply 204 may have a maximum power rating of 1,800 watts overall, such that it can be considered to be able to provide each of the computing devices 202 a total of 300 watts. Therefore, as to the computing device 202A by itself, the power supply 204 can be considered as having a maximum power rating of 300 watts. The maximum power usage setting 212 for the computing device 202A is therefore typically less than (and no greater than in any case) 300 watts in this example.

Determining Maximum Power Usage Setting

Figure 3:
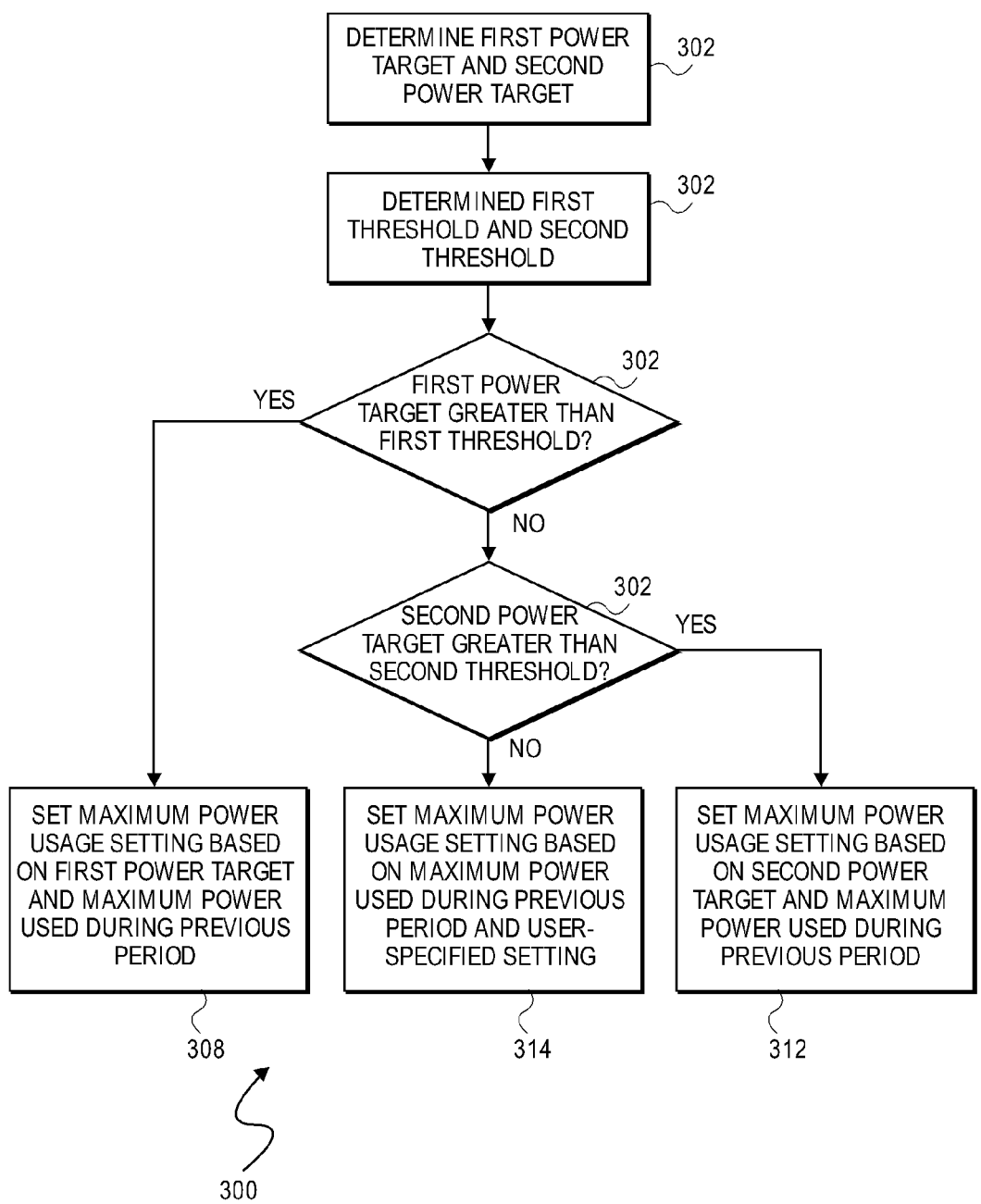
FIG. 3 is a flowchart of a method for determining a maximum power usage setting for a computing device, according to an embodiment of the invention.

FIG. 3 shows a method 300 for determining the maximum power usage setting for a computing device, according to an embodiment of the invention. Thus, the method 300 may be used to implement part 108 of the method 100 of FIG. 1. The method 300 may be performed by the computing device 202A itself, or by the management module 206 for the computing device 202A, in the embodiment of FIG. 2.

A first power target and a second power target are determined (302). These power targets are values that will be compared against respective thresholds to control how the maximum power usage setting is determined. The first power target is based on the average frequency of the processor of the computing device in relation to which the method 300 is being performed, as well as on the nominal frequency of this processor. More specifically, the first power target may be set equal to 100% times (the nominal frequency minus the average frequency), divided by the nominal frequency. The second power target is based on the minimum frequency of the processor of the computing device, as well as on the nominal frequency of this processor. More specifically, the second power target may be set equal to 100% times (the nominal frequency minus the minimum frequency), divided by the nominal frequency.

A first threshold and a second threshold are then determined (304). The first threshold is that against which the first power target will be compared, and the second threshold is that against which the second power target will be compared, to control how the maximum power usage setting is determined. In one embodiment, where the user-specified setting is negative (i.e., less than zero), then the first threshold is set equal to the absolute value of the user-specified setting divided by a constant, such as two. Where the user-specified setting is non-negative (i.e., greater than or equal to zero), then the first threshold is set equal to one.

Similarly, in one embodiment, where the user-specified setting is negative (i.e., less than zero), then the second threshold is set equal to the absolute value of the user-specified setting divided by a constant. In one embodiment, this constant is one, such that the second threshold is effectively set equal to the absolute value of the user-specified setting. Where the user-specified setting is non-negative (i.e., greater than or equal to zero), then the second threshold is set equal to one.

Where the first power target is greater than the first threshold (306), then, the maximum power usage setting is set based on the first power target and the maximum power used by the computing device during the previous period (308). More specifically, in one embodiment, the maximum power usage setting is set equal to the maximum power used by the computing device during the previous period, multiplied by a value based on the first power target. The value may be equal to a rounded-down integer value equal to (one plus the first power target), divided by 100.

However, where the first power target is not greater than the first threshold (306), but where the second power target is greater than the second threshold (310), then the maximum power usage setting is set based on the second power target and the maximum power used by the computing device during the previous period (312). More specifically, in one embodiment, the maximum power usage setting is set equal to the maximum power used by the computing device during the previous period, multiplied by a value based on the second power target. The value may be equal to a rounded-down integer value equal to (one plus the second power target), divided by 100.

Where the first power target is not greater than the first threshold (306), however, and the second power target is not greater than the second threshold (310), then the maximum power usage setting is set based on the maximum power used by the computing device during the previous period and the user-specified setting (314). More specifically, in one embodiment, the maximum power usage setting is set equal to the maximum power used by the computing device during the previous period, multiplied by a value based on the user-specified setting. The value may be equal to a rounded-down integer value equal to two times (a constant plus the user-specified setting minus one), divided by the constant. The constant may be 100 in one embodiment, such that the value is equal to the rounded-down integer value of two times (199 plus the user-specified setting), divided by 200.

The power targets and the power thresholds are thus employed in the method 300 so that, in general, the maximum power usage setting is set based on the maximum power used during the previous period and the user-specified setting as in part 314. However, the first power target can come into play in parts 306 and 308, where the first power target is greater than a first threshold that is dependent on the user-specified setting. The first power target relates to the average frequency of the processor of the computing device, and thus relates to the power used by the computing device throughout the previous period in question, insofar as the average frequency of the processor is affected by the power used by the device throughout this period. That is, the average frequency of the processor decreases when the frequency is decreased to reduce power consumption by the computing device. Thus, in effect, comparing the first power target to the first threshold involves comparing a value based on the average frequency of the processor (relative to the nominal frequency) in relation to a value based on the user-specified setting.

Similarly, the second power target can come into play in parts 310 and 312, where the second power target is greater than a second threshold that is depend on the user-specified setting. The second power target relates to the minimum frequency of the processor of the computing device, and thus relates to the power used by the computing device within a brief length of time within the period in question. That is, the frequency of the processor is decreased to reduce power consumption by the computing device, and thus the minimum frequency of the processor is the greatest amount by which the frequency was reduced during the period in question to reduce power consumption by the device. Thus, in effect, comparing the second power target to the second threshold involves comparing a value based on the minimum frequency of the processor (relative to the nominal frequency) in relation to a value based on the user-specified setting.

CONCLUSION

It is noted that, although specific embodiments have been illustrated and described herein, it will be appreciated by those of ordinary skill in the art that any arrangement calculated to achieve the same purpose may be substituted for the specific embodiments shown. This application is thus intended to cover any adaptations or variations of embodiments of the present invention. Therefore, it is manifestly intended that this invention be limited only by the claims and equivalents thereof.

We claim:

1. A method comprising:
    determining a maximum power usage setting for a computing device based on one or more of: a user-specified setting corresponding to how often a frequency of a processor of the computing device is likely to have to be decreased to reduce power usage by the computing device; an average frequency of the processor during a previous period in which the computing device was operated; a minimum frequency of the processor during the previous period; a maximum power that the computing device used during the previous period; and, a nominal frequency of the processor; and,
    setting the maximum power usage setting for the computing device as has been determined,
    wherein one of:
        (a) determining the maximum power usage setting for the computing device comprises setting the maximum power usage setting based on the maximum power used during the previous period and the user-specified setting, by multiplying the maximum power used during the previous period by a first value based on the user-specified setting;
        (b) determining the maximum power usage setting for the computing device comprises, where a power target based on the average frequency of the processor and the nominal frequency of the processor is greater than a first threshold, setting the maximum power usage setting based on the power target and the maximum power that the computing device used during the previous period, and where one of:
            (1) the power target comprises 100% times the nominal frequency of the processor minus the average frequency of the processor, divided by the nominal frequency of the processor;
            (2) setting the maximum power usage setting based on the power target and the maximum power that the computing device used during the previous period comprises multiplying the maximum power used during the previous period by a second value based on the power target;
            (3) where the user-specified setting is less than zero, the first threshold is equal to an absolute value of the user-specified setting divided by a constant;
        (c) determining the maximum power usage setting for the computing device comprises, where a power target based on the minimum frequency of the processor and the nominal frequency of the processor is greater than a second threshold, setting the maximum power usage setting based on the power target and the maximum power that the computing device used during the previous period, and where one of:
            (1) the power target comprises 100% times the nominal frequency of the processor minus the minimum frequency of the processor, divided by the nominal frequency of the processor;
            (2) setting the maximum power usage setting based on the power target and the maximum power that the computing device used during the previous period comprises multiplying the maximum power used during the previous period by a third value based on the power target;
            (3) where the user-specified setting is less than zero, the second threshold is equal to an absolute value of the user-specified setting divided by a constant.

2. The method of claim 1, further comprising:
    where the computing device starts to use more power than the maximum power usage setting, reducing the power used by the computing device to not exceed the maximum power usage setting.

3. The method of claim 2, wherein reducing the power used by the computing device comprises decreasing the frequency of the processor of the computing device.

4. The method of claim 1, wherein the first value comprises a rounded-down integer value equal to two times a constant plus the user-specified setting minus one, divided by the constant.

5. The method of claim 1, wherein the second value comprises a rounded-down integer value equal to one plus the power target, divided by one hundred.

6. The method of claim 1, wherein the third value comprises a rounded-down integer value equal to one plus the power target, divided by one hundred.

7. A computing device comprising:
    a processor operable at a frequency that is modifiable to control power usage by the computing device;
    a power supply to provide power to the computing device and having a maximum power rating; and,
    a mechanism to decrease the frequency at which the processor operates to reduce the power used by the computing device where the computing device starts to use more power than a maximum power usage setting, the maximum power usage setting less than the maximum power rating of the power supply,
    wherein the maximum power usage setting is based on one or more of: a user-specified setting corresponding to how often the frequency of the processor is likely to have to be decreased to reduce power usage by the computing device; an average frequency of the processor during a previous period in which the computing device was operated; a minimum frequency of the processor during the previous period; a maximum power that the computing device used during the previous period; and, a nominal frequency of the processor,
    and wherein:
        where a first power target based on the average frequency of the processor and the nominal frequency of the processor is greater than a first threshold, the maximum power usage setting is based on the first power target and the maximum power that the computing device used during the previous period;
        where a second power target based on the minimum frequency of the processor and the nominal frequency of the processor is greater than a second threshold, the maximum power usage setting is based on the second power target and the maximum power that the computing device used during the previous period; and, where the first power target is not greater than the first threshold and the second power target is not greater than the second threshold, the maximum power usage setting is based on the maximum power used during the previous period and the user-specified setting.

8. An article of manufacture comprising:

a tangible computer-readable medium; and, means in the medium for decreasing a frequency at which a processor of a computing device operates to reduce power used by the computing device where the computing device starts to use more power than a maximum power usage setting, wherein the maximum power usage setting is based on one or more of: a user-specified setting corresponding to how often the frequency of the processor is likely to have to be decreased to reduce power usage by the computing device; an average frequency of the processor during a previous period in which the computing device was operated; a minimum frequency of the processor during the previous period; a maximum power that the computing device used during the previous period; and, a nominal frequency of the processor, and wherein:

where a first power target based on the average frequency of the processor and the nominal frequency of the processor is greater than a first threshold, the maximum power usage setting is based on the first power target and the maximum power that the computing device used during the previous period;

where a second power target based on the minimum frequency of the processor and the nominal frequency of the processor is greater than a second threshold, the maximum power usage setting is based on the second power target and the maximum power that the computing device used during the previous period; and, where the first power target is not greater than the first threshold and the second power target is not greater than the second threshold, the maximum power usage setting is based on the maximum power used during the previous period and the user-specified setting.

* * * * *